UNITED STATES PATENT OFFICE.

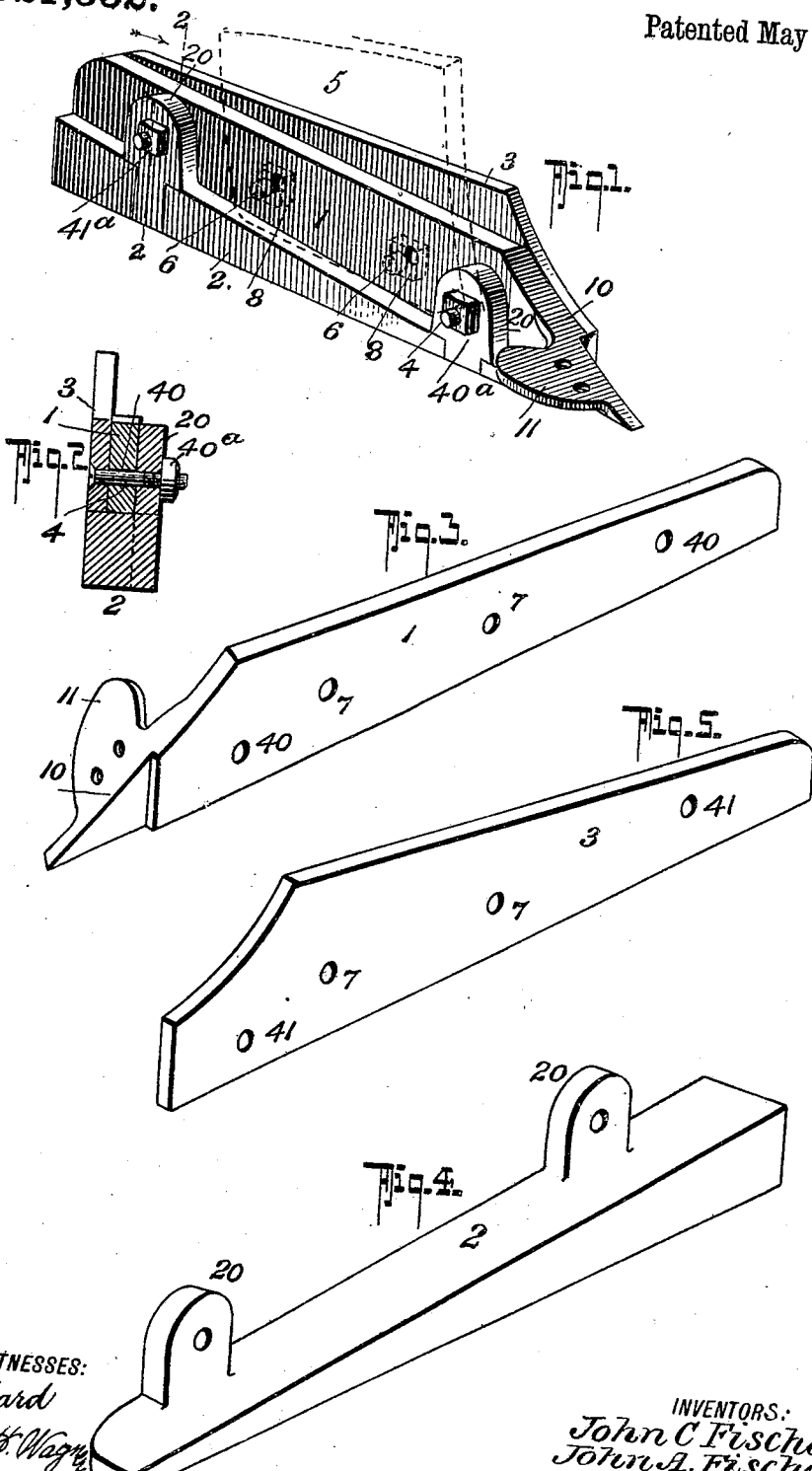

JOHN C. FISCHER AND JOHN A. FISCHER, OF LEXINGTON, OKLAHOMA.

LANDSIDE FOR PLOWS.

No. 921,532.     Specification of Letters Patent.     Patented May 11, 1909.

Application filed January 18, 1909. Serial No. 472,864.

*To all whom it may concern:*

Be it known that we, JOHN C. FISCHER and JOHN A. FISCHER, residing at Lexington, in the county of Cleveland and State of Oklahoma, have invented a new and Improved Landside for Plows, of which the following is a specification.

Our invention, which in its general nature, has for its object to provide a new and improved construction of plow landside, more particularly has for its purpose to provide a plow portion of the character stated, in which special provision is made for giving rigidity to the plow carrying member, for protecting the same for undue wear and for removably connecting it with a protecting member so that when the said protecting member becomes worn out or broken, a new one can be substituted therefor without the necessity of disconnecting the plow carrying member from the plow beam.

With other objects in view that will hereinafter appear, our invention, in its subordinate features, consists in the peculiar combination and novel arrangement of the several parts, as hereinafter fully described, specifically pointed out in the appended claims and illustrated in the accompanying drawing, in which:—

Figure 1, is a perspective view of our improved plow landside construction, the pendent portion of the plow beam being shown in dotted lines. Fig. 2, is a transverse section thereof on the line 2—2 of Fig. 1. Fig. 3, is a perspective view of the main landside member or plow carrying bar. Fig. 4, is a similar view of the drag shoe or protecting member, and Fig. 5, is a like view of the face or guard plate.

In the practical construction, our improved landside comprises three main parts or members, designated 1, 2 and 3, one of which, hereinafter termed the main or plow carrying bar 1, has its front or penetrating end suitably curved as at 10 and has a lateral extension 11 to which the plow point and mold board, not shown, may be secured in any approved manner.

The member 2 is in the nature of a shoe or drag portion and it forms the rest for the bar 1 and to provide for bringing the outer or plow end of the said bar 1 in a plane with the bottom of the shoe 2, the said shoe is wedge shaped in the direction of its length, as clearly shown in Figs. 1 and 4, such relative arrangement of the said members 1 and 2 serving to bring the plow point end of the bar at the proper penetrating inclination with respect to the beam and landside, proper.

To provide for the desired rigidity of the plow bar 1 and also for protecting its landside face from undue wear, a guard member 3, in the nature of a thin steel plate, is secured to the bar 1 by the stud bolts 4—4 that take through the alining apertures 40—41 in the members 1 and 3 and the nuts 40$^a$ and 41$^a$, as clearly shown in Fig. 2, by reference to which it will be also observed that the bolts pass through a pair of extensions or lugs 20—20 that project vertically from the inner edge of the shoe or drag member 2, on which the said ears are welded or fixedly formed therewith in any approved manner.

So far as described, it will be readily apparent that by connecting the outer plate 3 and the bottom or drag plate 2 to the main or plow carrying member 1 as shown, that the said member 1 has its under face protected from wear by the drag shoe 2 and its outer face is protected by the plate 3, and since, in the practical application of my form of land side, the members 1 and 3 are fixedly held on the lower end of the plow beam 5, to which they are preferably secured by the stud bolts 6—6 that extend through the beam and through the alining apertures 7—7 on the members 3 and 1 and receive the securing nut 8, as shown, it follows that the part that wears the quickest, the shoe member 2, can be readily removed and another set in its place to give the desired protection to the two members 1 and 3.

It will be noticed by reference to Fig. 2 that the drag or shoe member 2 extends beyond the outer or landside face of the member 1 and also forms the drag or protecting member for the lower edge of the member 3 which rests on the member 1, as shown.

Having thus described our invention, what we claim and desire to secure by Letters Patent, is:—

1. A plow landside that comprises a main or plow carrying bar, a guard plate that extends over the outer face of the main bar, means for fixedly attaching the main and guard plate to the plow beam, a drag shoe that extends the full length of both of the aforesaid members, and means for detachably connecting the shoe to the said guard and main members.

2. The combination with the main or plow carrying bar having its front end formed to receive the plow share and mold board, a guard plate that fits over the landside of the plow carrying bar, and means for connecting the plate and bar together and to the plow beam; of a drag shoe that extends under and engages the bottom edges of the main and guard member, said shoe having upwardly extended apertured ears, and means for detachably connecting the main and guard members to the ears.

3. The combination with the main or plow carrying bar having its front end formed to receive the plow share and mold board, a guard plate that fits over the landside of the plow carrying bar, and means for connecting the plate and bar together and to the plow beam; of a drag shoe that extends under and engages the bottom edges of the main and guard member, said shoe having upwardly extended apertured ears, means for detachably connecting the main and guard members to the ears, the said drag shoe being wedge shaped in the direction of its length.

JOHN C. FISCHER.
JOHN A. FISCHER.

Witnesses:
A. P. MEEK,
B. E. TODD.